United States Patent
Goldman

(10) Patent No.: US 10,716,453 B1
(45) Date of Patent: Jul. 21, 2020

(54) DRYING RACK

(71) Applicant: Michael Goldman, Miramar, FL (US)

(72) Inventor: Michael Goldman, Miramar, FL (US)

( * ) Notice: Subject to any disclaimer, the term of this patent is extended or adjusted under 35 U.S.C. 154(b) by 0 days.

(21) Appl. No.: 16/428,102

(22) Filed: May 31, 2019

(51) Int. Cl.
*A47L 19/00* (2006.01)
*A47L 19/04* (2006.01)
*A47J 47/16* (2006.01)
*B25H 3/04* (2006.01)
*A47J 47/20* (2019.01)

(52) U.S. Cl.
CPC .............. *A47L 19/04* (2013.01); *A47J 47/16* (2013.01); *A47J 47/20* (2013.01); *B25H 3/04* (2013.01)

(58) Field of Classification Search
CPC ...... A47L 19/04; A47F 7/0064; A47F 7/0021; B25H 3/04; A47J 47/20; A47J 47/16
See application file for complete search history.

(56) References Cited

U.S. PATENT DOCUMENTS

| | | | | |
|---|---|---|---|---|
| 1,406,773 A | * | 2/1922 | Stoffel | A47L 19/00 211/41.3 |
| 4,169,638 A | * | 10/1979 | Cirasuolo | A47L 19/04 211/41.6 |
| 5,000,326 A | * | 3/1991 | Vaughn | A47F 7/0064 211/41.11 |
| 5,660,284 A | * | 8/1997 | Vaughn | A47F 7/0064 211/175 |
| 6,367,636 B1 | * | 4/2002 | Walker | A47L 19/02 211/41.3 |
| 6,543,069 B1 | * | 4/2003 | Nelson | A47L 19/04 211/41.3 |
| 7,735,661 B1 | * | 6/2010 | Sumner | A47L 19/04 211/41.3 |

* cited by examiner

*Primary Examiner* — Kimberley S Wright
(74) *Attorney, Agent, or Firm* — Christopher J. Van Dam, P.A.; Chris Vandam

(57) ABSTRACT

A drying rack that supports a tray and dish rack for drying dishes. The drying rack has a low side and a high side. The low side is placed adjacent to a sink. A dish rack and tray are placed on the drying rack so that any water dripping off dished held in the dish rack drips into the sink. The elements of the drying rack disassemble without tools to store the device flat.

3 Claims, 2 Drawing Sheets

DRYING RACK

BACKGROUND OF THE INVENTION

1. Field of the Invention

The present invention relates to household kitchen drying devices, and more particularly, to an improved support for a dish drying rack.

2. Description of the Related Art

Several designs for drying racks have been designed in the past. None of them, however, includes a solid angled support structure that supports a standard dish drying rack at an angle, with sufficient support to hold a plurality of dishes, to direct draining water over the rim of an adjacent sink to aid in the drying process.

Applicant believes that the closest known prior corresponds to commonly available plastic or wire drying racks that hold a series of dishes, some with a tray that fits under the rack. However, it differs from the present invention because the prior art fails to provide for efficient draining of the rack and encourages retention of moisture that causes mold, mildew and scum build up. Whereas, the present invention provides a stable structure to support a drying rack and tray at an angle sufficient to permit draining of the tray into a sink yet horizontal enough to allow the rack to be used normally to hold a plurality of dishes in a position to permit support of the dishes and draining of the dishes onto the sink to prevent water buildup and more efficient drying of both the dishes and the tray.

Other known prior art and patents describing the closest subject matter provide for a number of more or less complicated features that fail to solve the problem in an efficient and economical way. None of these patents suggest the novel features of the present invention in its several embodiments.

A brief abstract of the technical disclosure in the specification and title are provided as well for the purposes of complying with 37 CFR 1.72 and are not intended to be used for interpreting or limiting the scope of the claims.

Without limiting the scope of the invention, a brief summary of some of the claimed embodiments of the invention is set forth below. Additional details of the summarized embodiments of the invention and/or additional embodiments of the invention may be found in the detailed description of the invention below.

SUMMARY OF THE INVENTION

It is one of the main objects of the present invention to provide a drying rack that aids in drying a dish rack and tray.

It is another object of this invention to provide a drying rack that uses a common drying and tray to drain water into a sink to efficiently dispose of water dripping off the dishes.

It is still another object of the present invention to provide a drying rack that supports a full tray of dishes similar to if that tray was placed on solid counter top.

It is another object of the present invention to provide a drying rack that is easy to disassembly for cleaning, storage and transport of the device. It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
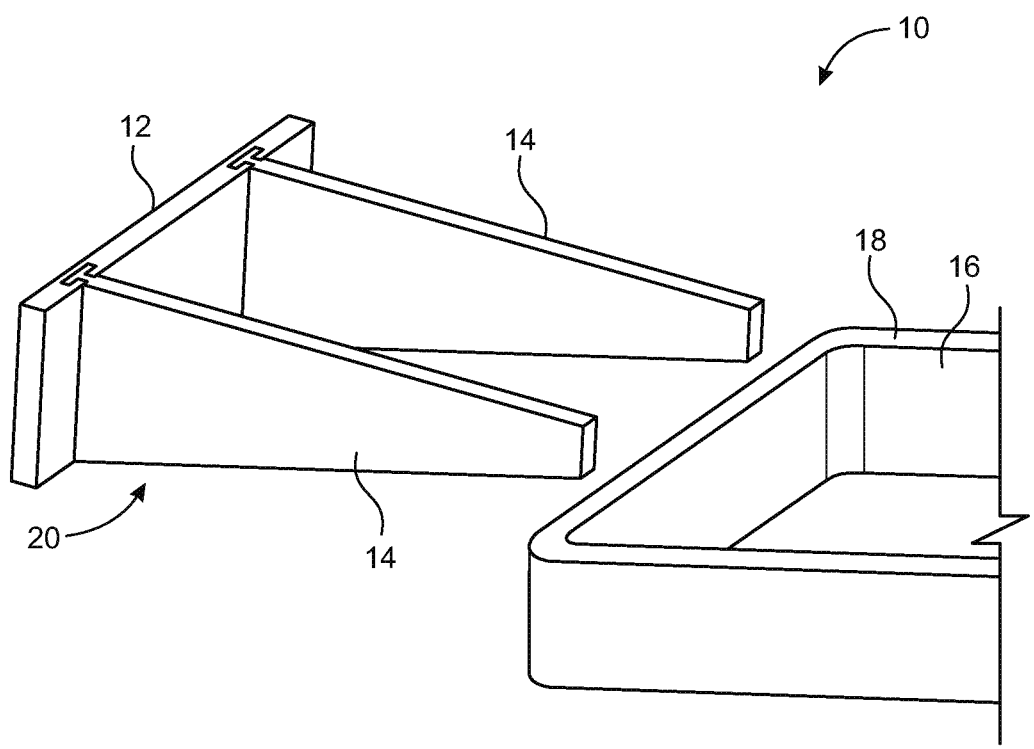
FIG. 1 shows a perspective view of a drying rack support with the rack removed.

While this invention may be embodied in many different forms, there are described in detail herein specific embodiments of the invention. This description is an exemplary of the principles of the invention and is not intended to limit the invention to the particular embodiments illustrated and described.

For the purpose of this disclosure, like reference numerals in the figures shall refer to like features unless otherwise indicated or is obvious by context.

The subject device and method of use is sometimes referred to as the device, the invention, the drying rack, the rack, the tray, the dryer, the support, the assembly, the machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes, among other features shown and described, a brace 12, supports 14, a sink 16, a rim 18, a counter 20, a tray 22, a rack 24, dishes 26, a lip 28, slots 30, keys 32, feet 34 and a brace 36.

Figure 2:
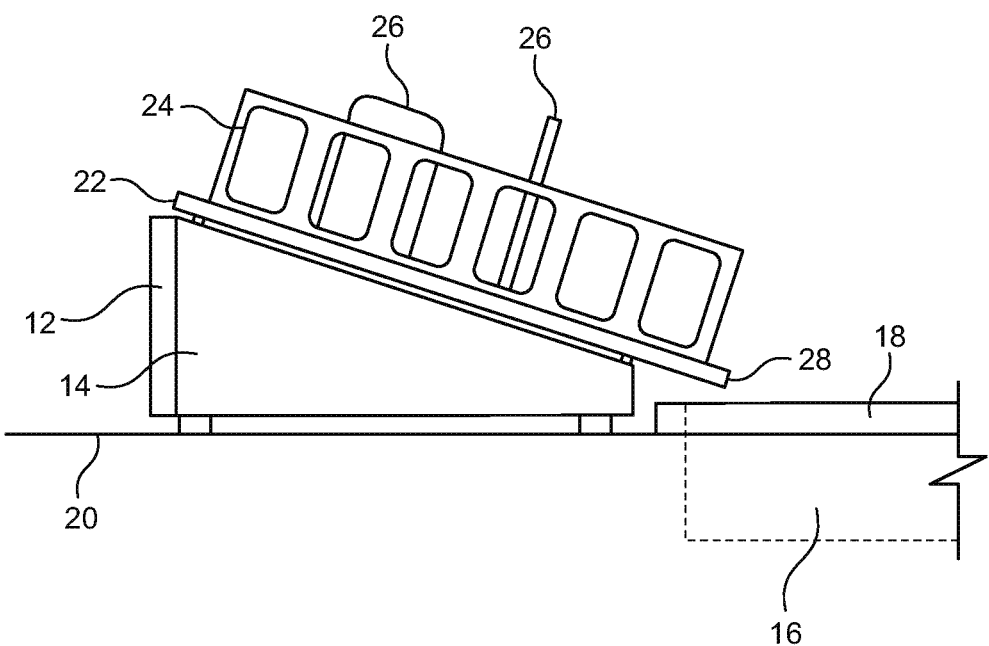
FIG. 2 shows an elevation view of a drying rack with rack and tray installed over a sink.

Looking at FIGS. 1 and 2, an example of a drying rack is shown resting on a counter 20 adjacent to a sink 16. The rack 24 is held at an and angle by the supports 14. Any water on wet and drying dishes 26 in the rack 24 will fall onto the tray 22 and flow by gravity down the tray 22 and into the sink 16.

Generally, the tray 22 has a lip 28 on a lower edge that extends off the edge of the support 14 so that the lip 28 is over the sink 16 and the water flowing down the tray 22 will be deposited into the sink 16 where it goes down the drain in the sink 16.

An important problem for prior art devices, essentially just the tray 22 and rack 24, is that the water from draining dishes 26 will accumulate in the tray 22 where it pools and therefore will not dry quickly. The dishes 26 will dry normally but the tray 22 and rack 24 will eventually mold and become grimy.

Having a tray 22 that will be wet for protracted periods after each use will also tend to prevent conscientious users from storing the tray 22 and rack 24 until it is air dried. This occupies limited counter 20 space used for food preparation and makes a kitchen cluttered. Being able to have a dry tray 22 and rack 24 after a few minutes of air drying allows that user to store the tray 22 and rack without risk of mold, mildew and other moisture loving contaminants.

For the less than conscientious user who stores the tray 22 and rack 24 wet, the mold and mildew will fester in a confined storage space. Dishes 26 wont be able to dry on a clean rack 24 the next time is it used. This user will also be more likely to have to replace the rack 24 and tray 22 much sooner than the user who stores a dried tray 22 and rack 24 because they will stay cleaner.

Figure 4:
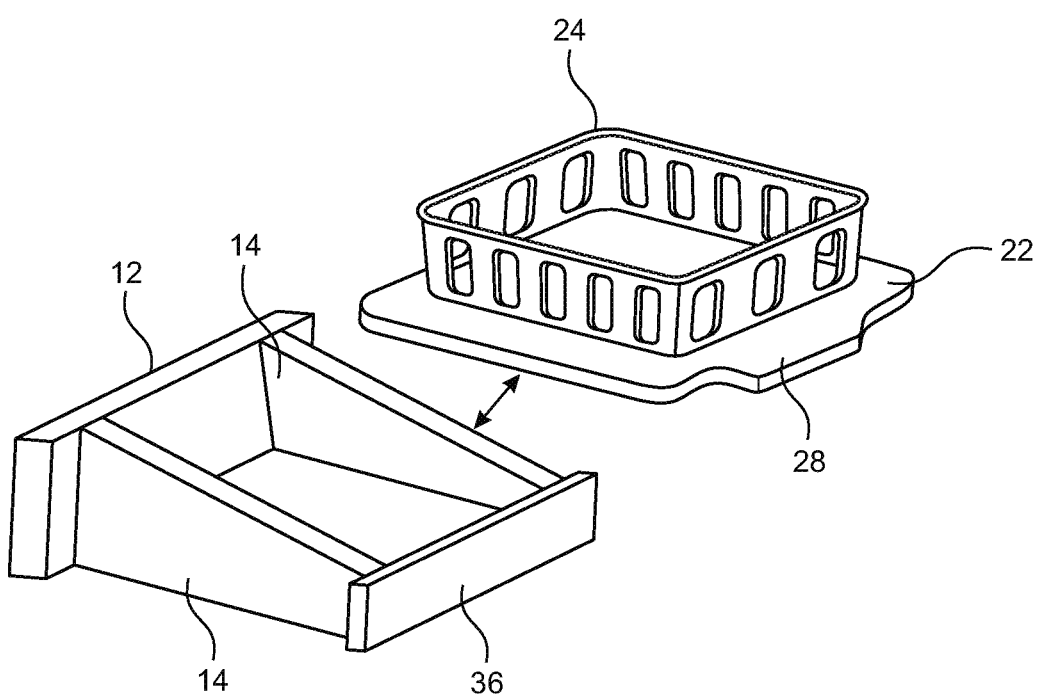
FIG. 4 shows an exploded perspective view of a version of a drying rack and rack/tray combination.

The tray 22 and rack 24 are generally expected to be store bought by the user of the drying rack device encompassed in the present invention. These are generally plastic or metal and are purchased as a combination set of both the tray 22 and the rack 24. An example of this combination is shown in FIG. 4.

Looking again at FIGS. 1 and 2 where the drying rack is shown supporting a tray 22, rack 24 and dishes 26. The drying rack is generally comprised of, among other parts, a pair of supports 14 and a brace 12. The supports 14 are each connected to the brace 12 at one end of the support 14 so that the supports are generally parallel.

The combination of the brace 12 and two supports 14 is dimensioned and adapted to support the anticipated size and weight of the dishes 26 contained in the rack 24 and the tray 22. This is typically about ten pounds, but can vary depending on the size of the rack 24, the number of dishes 26 and the nature or type of dishes 26.

The supports 14 and brace 12 should be constructed of a non-absorbent such as plastic. Alternatives could include natural products like wood or bamboo, metal or other material that will be sufficiently robust to carry the load placed on top.

In one version, the inventive concept of the drying rack is embodied in a pair of supports 14 with one brace 12 at the taller end of the supports 14, as see in FIG. 1. In a closely related version there may be an additional brace 36 on the low end of the supports 14. The brace 36 or an additional brace could be anywhere along the supports 14 to maintain the supports 14 generally parallel to each other and both generally vertical relative to the counter 20 on which the device is used.

Figure 3:
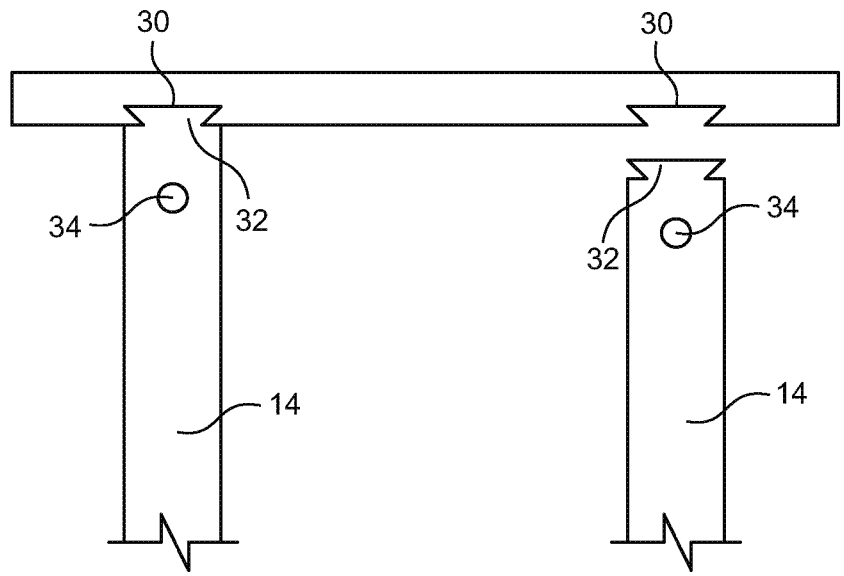
FIG. 3 shows a bottom plan view of the connection between elements of the drying rack.

Looking now at FIG. 3, a detail of the connection between the brace 12 and the supports 14 is shown. A pair of parallel slots 30 in one surface of the brace 12 are provided to mate with the key 32 formed into an end of the supports 14. The supports 14 will thereby be held against the brace 12 forming an assembled drying rack.

Because of the complimentary shape of the slots 30 and keys 32 the brace 12 can be easily slid apart from the support 14. When the bottom edges of the brace 12 and supports 14 are set onto a counter 20, there is little possibility of the parts separating. Yet, when the user desires to separate the support 14 from the brace 12 they simply hold the brace 12 down and pull each support 14 vertically there by sliding the key 14 from the slot 30. This results in three separate components that can be stored flat in a drawer or other convenient storage space.

In the version of the drying rack shown in FIG. 4, with the additional low side brace 36, there may be similar slots in the brace 36 and keys 32 on each vertical end of each support 14. Each of the four parts may thus be similarly separated and stored flat.

It should be appreciated that the exact geometry of the slot is not critical to the functionality of the drying rack. The slot 30 and key 32 should be complimentary so that they fit snugly together yet with enough clearance to be able to slide past each other during the assembly and disassembly process. The angular pin and dovetail design shown in FIG. 3 and the 'T' key-way in FIG. 1 are merely enabling examples with other shapes being equally effective.

Advantages of the tool-less means to disassemble the parts come apart and assemble easily with only the hands of the user. This allows the device to be stored flat, using minimal space. It can also be shipped flat, making it easier for distribution. Another advantage is that there need only be one mold for the supports 14 because they can be fabricated to be identical, cutting down on manufacturing costs.

FIG. 3 also shows optional feet 34 that may be located on the bottom edge of the brace 12, brace 36 or supports 14. The feet 34 may be made of a soft plastic material to provide some grip onto the counter surface 20. Additionally, feet raise the bottom edge of the supports 14 and braces 12 and 36 off of the counter top to aid in airflow when allowing the counter 20 to dry naturally.

An important version of the invention can be fairly described as a drying rack comprised of, among other things, a brace, a first support and a second support. The first and second supports are both made from a planar sheets material, such as plastic, and each has a base edge opposing a support edge and a short edge opposing a tall edge, essentially forming a quadrilateral or trapezoid. The brace is made from a planar material, such as plastic and has a mounting surface on one side. The brace includes two parallel slots formed into the mounting surface in spaced relation, essentially to vertical tracks. The tall edge of the first and second support each comprise a key that is dimensioned to each slide into one of the slots on the brace thereby affixing the support edges of each the first and second supports perpendicularly to the mounting surface of the brace. The supports can thereby be connected and disconnected from the brace without use of any tools. A preselected tray is placed onto the support edges of both the first and second supports and a dish rack is placed onto the tray and a lower edge of the tray is positioned over a sink so that a water dripping from a dish onto the tray falls into the sink down the angled tray. Optionally, the first support and second support are identical so that they can be interchanged and only mold is needed for fabrication of both provided supports. Optionally, a second brace connects the first and second supports at or near the short edge.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A support for a dish drying rack comprised of a brace, a first support and a second support;

the first and second supports are both planar and each has a base edge opposing a support edge and a short edge opposing a tall edge;

the brace is planar and has a mounting surface;

the brace includes two parallel slots formed into the mounting surface in spaced relation;

the tall edge of the first and second support each comprise a key that is configured to each removably slide into one of the slots on the brace thereby affixing the support edges of each the first and second supports perpendicularly to the mounting surface of the brace;

wherein a preselected tray is placed onto the support edges of both the first and second supports and a lower end of the tray extends below a lower end of the supports;

the dish drying rack is placed onto the tray and the lower edge of the tray is positioned over a sink so that a water dripping from a dish in the dish drying rack onto the tray falls into the sink;

and wherein the keys side out of the slots to separate each brace from the support so that the supports and braces may be stored flat together.

2. The support for a dish drying rack in claim 1 further characterized in that the first support and second support are identical.

3. The support for a dish drying rack in claim 1 further characterized in that a second brace connects the first and second supports at the short edge.

\* \* \* \* \*